Sept. 26, 1967 T. J. GREER, JR., ET AL 3,343,281
EDUCATIONAL DEVICE
Filed April 8, 1965

United States Patent Office 3,343,281
Patented Sept. 26, 1967

3,343,281
EDUCATIONAL DEVICE
Thomas J. Greer, Jr., 204 Adams St. NE., Washington, D.C. 20002, and Thomas I. Davenport, Ambler, Pa.; said Davenport assignor to said Greer
Filed Apr. 8, 1965, Ser. No. 446,652
7 Claims. (Cl. 35—35)

This invention relates to an educational device or kit and more particularly to an educational device for the teaching of small children.

The prior art is aware of what may be termed "talking books" as embodied, for example, in the following U.S. Patents—2,369,572, 2,546,680, 2,548,011, 2,822,425, 2,-936,342, 2,945,307, and 3,086,297. Thus, it is known that stored information, such as speech recorded on magnetic tape, may be associated in some manner with text material as a printed or illustrated page. It is further known to provide some means for retrieving the information as, for example, by a magnetic pick-up head, coupled to an amplifier and loud speaker, which passes over the magnetic tape. While serving the functions for which they were intended, prior devices of this type have not fully utilized their possibilities teaching young children.

Modern psychology recognizes that the element of motivation plays a major role in the learning process. Thus, psychology readily differentiates between the case of a student learning an uninteresting task out of compulsion and the case of a student learning a task and displaying intense interest therein. In the case of adult learning, it is extremely difficult to insure that the element of motivation will be present since a task or a situation which evokes interest on the part of one adult learner will not necessarily evoke interest on the part of another adult learner. In the case of children, as opposed to adult learners, it is widely known that if a thing, even so simple as a lollipop, will evoke interest in one child, it is probable that it will evoke interest in yet another child, provided the children are young enough.

Modern psychology recognizes that the maternal instinct in females is exhibited at a very early age, although it is not definitely known whether, at young ages, this instinct is innate or is learned. In any event, it is recognized that young girls enjoy playing with dolls and that such play activity is often coupled with the desire to treat the doll in a manner similar to the manner in which an adult mother treats a natural child. Thus, there are available commercially dolls which require dressing, diaper changing, etc., all evidences of the above proposition.

The present invention relates to an educational device adapted to teach language to young children, especially to young girls, by utilizing the drive or the urge of these young children to provide adult, maternal care for a doll, doing those things to the doll which an adult would do to a natural child. In carrying out this invention, a doll or other simulated form of a real or imaginary being is associated with a book. The book carries magnetic tapes, and a magnetic pick-up head is carried by the doll. In use, the child holds the doll and associated book and guides the doll's hand over the magnetic tape to thereby pick up the speech recorded thereon. Printed matter or illustrations may be placed in combination with the magnetic tape and thus the child, for the purpose of teaching the doll how to read or in teaching the doll a story, itself learns the recorded material. The child, further, associates a book with something interesting, here a story, and is thus conditioned to an affinity for books. The invention may also be practiced by placing the doll at a desk at which the doll sits and reads, all while the child is supervising the activity. In lieu of magnetic tapes, an undulating track and stylus may be used, as suggested in U.S. Patents 2,822,425 and 2,997,306.

Figure 1:
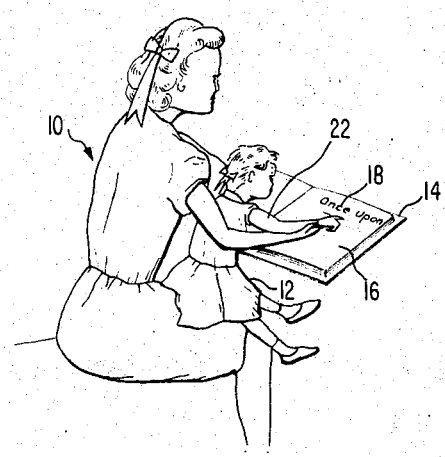
FIGURE 1 is a perspective view of a child holding a doll upon its lap and guiding the hand of the doll over a book containing printed or illustrated matter, with magnetic tape associated with the matter.

Referring now to FIGURE 1 of the drawings, the numeral 10 denotes a young girl holding in her lap a doll 12. Either in the lap of the doll or in the lap of the young girl or upon a support such as a table, a book 14 or a simulation thereof is provided with at least one page 16 having printed matter 18 thereon and magnetic tape 20 suitably affixed to the page 16. As will be observed from an inspection of FIGURE 1, the child 10 is holding the right arm 22 of the doll 12 and guiding it across the page 16.

Figure 2:
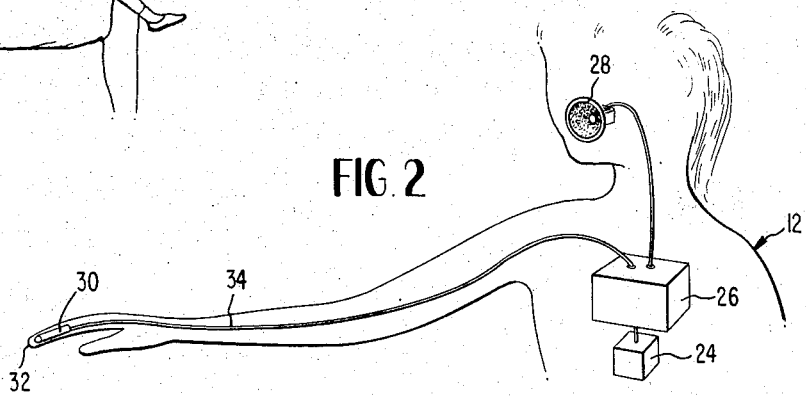
FIGURE 2 is a schematic illustration showing the basic organization of electrical elements within the doll.

Referring now to FIGURE 2 of the drawings, a portion of the doll 12 is shown and is provided internally with a power supply 24 supplying power for an amplifier 26 of any suitable design. A loudspeaker 28 is positioned in the head of the doll 12 adjacent the mouth simulation thereof. The numeral 30 denotes a magentic pick-up head or device of any desired structure, well known to workers in this art, placed in an outstretched finger 32 of the doll 12. An electrical coupling 34 couples the pick-up 30 to the amplifier 26. The precise details of construction of the pick-up 30, the loudspeaker 28, the amplifier 26, and the power supply 24 are well known to workers in this art and further description thereof is therefore not required.

Figure 3:
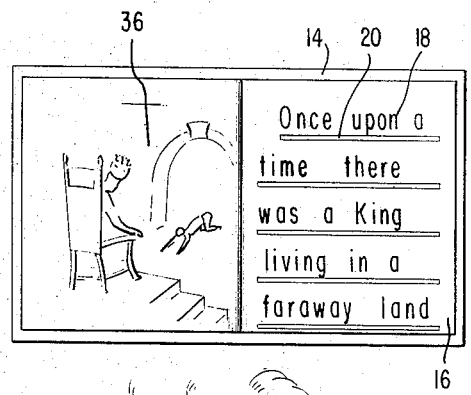
FIGURE 3 is a view of a book containing an illustration, printed matter and magnetic tape in combination with the printed matter.

Turning now to FIGURE 3 of the drawings, the book 14 is shown as comprising on one page thereof an illustration 36 and the printed matter 18 on the page 16, all in combination with magnetic tape 20.

In use, the young girl 10 energizes the doll 12 by turning a suitable switch conveniently placed on the doll and places the outstretched finger 32 of the doll on the lefthand portion of the uppermost magnetic tape 20. The girl then moves the finger 32 from left to right, thereby scanning the magnetic tape 20, and the correspondence between the information on magnetic tape 20 and the printed matter 18 is heard from the loudspeaker 28. Thus, the girl 10, in her own mind, is teaching the doll 12 the story or the other information on page 16.

Figure 4:
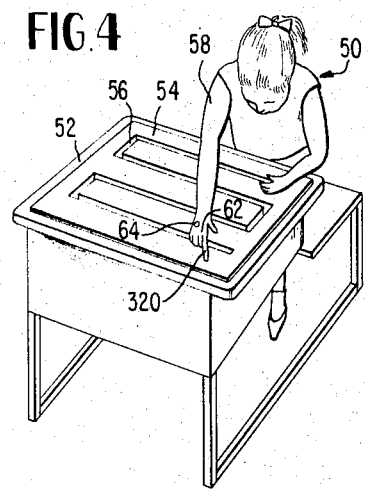
FIGURE 4 is a perspective illustration similar to FIGURE 1 but showing a modification where the doll is provided with a desk or table.

Turning now to FIGURE 4 of the drawings, an embodiment of the invention is illustrated which includes a doll 50 seated at a desk 52. The desk is provided with a top 54 having a continuous groove 56 therein. The right arm 58 of the doll is provided with a motor 60 in the right hand 62 of the doll 50. The right hand 62 is provided with a switch 64 on the upper surface thereof. The switch 64 may assume any one of an almost endless variety of forms, the precise form of which is here unimportant. The switch 64, when actuated, controls power to the motor 60, the power being supplied from batteries or the like suitably located within the torso of the doll 50. The right hand 62 of the doll 50 is provided with an outstretched finger 320 with the latter containing a magnetic pick-up device 300 which may be identical in construction to the previously described magnetic pick-up 30. Magnetic tape 66 is suitably affixed to or embedded in the desk top 54.

The motor 60 is provided with an output armature 68 to which is suitably affixed a wheel 70. Wheels 72 and 74 are linked by means of a linkage 76, with wheel 72 being coupled to wheel 70 by virtue of a linkage 78. A spring 80 is suitably affixed to the links 76 and 78 to urge their unjoined ends apart. As will be seen from an inspection of FIGURES 5 and 6, the wheels 70, 72 and 74 engage the sides of the groove 56. The direction of rotation of motor 60 is such that when the right hand 62 of the doll 50 is placed over the portion of groove 56 illustrated at FIGURE 4, with wheels 70 and 74 being solidly compressed against spring 80 so that the hand 62 may assume the position shown in FIGURE 5, and when the switch 64 is energized, the right hand will move from right to left as shown in FIGURE 4, or from the viewpoint of the doll 50, the right hand will move from left to right, i.e. the usual direction when reading.

Figure 5:
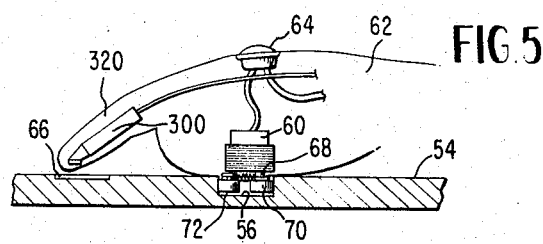
FIGURE 5 is a schematic partial cross-sectional view of one form of the invention.
Figure 6:
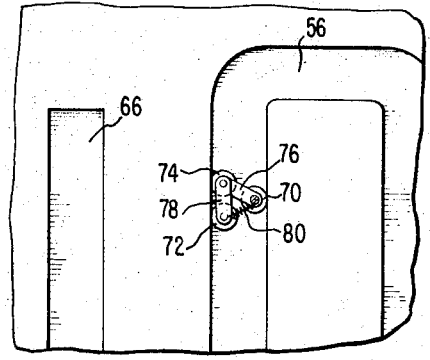
FIGURE 6 is a partial plan view of a portion of FIGURE 4.

From the above description, the mode of operation of the embodiment illustrated in FIGURES 4-6 is as follows. The child 10 places the doll 50 on the desk 52 and forces wheels 70 and 74 together to thereby place the right hand 62 in the position illustrated in FIGURE 5. The child then energizes the motor 60 by actuating switch 64, with the result that the doll's hand moves in the above-described direction. The pick-up device 300 receives the information from magnetic tape 66 and, the microphone 28 allows the child to hear the information placed on tape 66. While not illustrated in FIGURE 4, the desk top 54 has placed thereon printed or other information in combination with the tape 66. For additional or non-repetitive information, a plurality of desk tops 54 is provided, each having different printed or other indicia and different magnetic tapes 66.

If desired, paper or cardboard sheets may be provided with the magnetic tape affixed thereon, together with printed material, with the sheets being placed over the desk top 54 so that the same desk top may be used with various sheets, thus obviating the need for a new desk top each time a change of material is desired.

It is believed apparent that the internal construction of the doll 50 illustrated in FIGURE 4 is identical in all essential respects to the internal structure illustrated in FIGURE 2.

What is claimed is:

1. An educational kit comprising a doll, said doll having means at an articulated extremity of the doll for picking up stored information, said doll provided with means to convert said information into audible signals, and a planar surface carrying information thereon, said articulated extremity adapted to move across said planar surface, whereby said information is converted to audible signals.

2. The kit of claim 1 wherein said planar surface carries magnetic tape.

3. The kit of claim 1 wherein said planar surface carries an undulating track.

4. An educational kit comprising a doll provided with an information pick-up at an articulated extremity thereof, means carried by said doll for translating signals from said pick-up into audible signals, a planar surface, said planar surface carrying stored information thereon, a channel in said planar surface, means carried by an articulated portion of said doll for moving said articulated portion which carries said pick-up along said channel and over said information.

5. The kit of claim 4 wherein said last mentioned means includes a motor in combination with a wheel coupled thereto, with said wheel adapted to engage the sides of said groove in said planar surface.

6. The kit of claim 1 wherein printed matter is aligned with said information on said planar surface.

7. The kit of claim 4 wherein printed matter is aligned with said information on said planar surface.

References Cited
UNITED STATES PATENTS

| | | | |
|---|---|---|---|
| 2,548,011 | 4/1951 | Frost | 35—35.3 |
| 2,936,342 | 5/1960 | Kallmann | 35—35.3 X |
| 3,047,670 | 7/1962 | Gardner | 35—35.3 X |
| 3,159,942 | 12/1964 | Fiske | 46—117 X |

EUGENE R. CAPOZIO, *Primary Examiner.*

W. GRIEB, *Assistant Examiner.*